(12) United States Patent
Kim et al.

(10) Patent No.: US 10,871,396 B2
(45) Date of Patent: Dec. 22, 2020

(54) OPTICAL EMISSION SPECTROSCOPY CALIBRATION DEVICE AND SYSTEM INCLUDING THE SAME

(71) Applicant: SAMSUNG ELECTRONICS CO., LTD., Suwon-si (KR)

(72) Inventors: Jongsu Kim, Seongnam-si (KR); Younghwan Kim, Seoul (KR); Junbum Park, Goyang-si (KR); Youngjoo Lee, Hwaseong-si (KR); Sungho Jang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/751,356

(22) Filed: Jan. 24, 2020

(65) Prior Publication Data
US 2020/0319025 A1    Oct. 8, 2020

(30) Foreign Application Priority Data

Apr. 5, 2019  (KR) .................. 10-2019-0040370
Aug. 21, 2019 (KR) .................. 10-2019-0102604

(51) Int. Cl.
*G01J 3/28*   (2006.01)
*G01J 3/02*   (2006.01)
(Continued)

(52) U.S. Cl.
CPC ........... *G01J 3/0297* (2013.01); *G01J 3/0208* (2013.01); *G01J 3/0232* (2013.01); *G01J 3/10* (2013.01); *G02B 27/145* (2013.01)

(58) Field of Classification Search
CPC .. G01J 3/0294; G01J 3/443; G01J 3/30; G01J 3/0297; G01J 3/0232; G01J 3/10; G01J 3/0208; G02B 27/145
See application file for complete search history.

(56) References Cited

U.S. PATENT DOCUMENTS 5,759,424 A    6/1998  Imatake et al.
6,134,005 A   10/2000  Smith, Jr. et al.
(Continued)

FOREIGN PATENT DOCUMENTS

JP    2001-196353 A    7/2001
JP    5338467 B2      11/2013
(Continued)

*Primary Examiner* — Abdullahi Nur
(74) *Attorney, Agent, or Firm* — Sughrue Mion, PLLC

(57) ABSTRACT

An optical emission spectroscopy (OES) calibration system includes a chamber, an adapter, an OES device, a calibration device, and a spectrometer. The chamber includes a viewport. The adapter is fastened to the viewport, and includes a first beam splitter and a second beam splitter. The OES device detects plasma light generated in the chamber and transmitted through the adapter and generates OES data based on the detected plasma light. The calibration device includes a light source, and generates correction data for compensating for deviations in the OES data. The spectrometer detects light emitted from the light source and split by the first beam splitter or the second beam splitter. Each of the OES device, the calibration device, and the spectrometer is fastened to the adapter through an optical cable, and the calibration device generates the correction data using an intensity of light detected by the spectrometer.

20 Claims, 14 Drawing Sheets

(51) Int. Cl.
*G01J 3/10* (2006.01)
*G02B 27/14* (2006.01)

(56) References Cited

U.S. PATENT DOCUMENTS

| | | |
|---|---|---|
| 8,257,546 B2 | 9/2012 | Davis et al. |
| 9,865,438 B2 | 1/2018 | Tallavarjula et al. |
| 10,008,370 B2 | 6/2018 | Ohmori et al. |
| 2009/0103081 A1 | 4/2009 | Whelan et al. |
| 2010/0166945 A1* | 7/2010 | Lee .................. C23C 16/52 |
| | | 427/10 |
| 2018/0061691 A1 | 3/2018 | Jain et al. |

FOREIGN PATENT DOCUMENTS

| | | |
|---|---|---|
| JP | 2017-106106 A | 6/2017 |
| KR | 10-2010-0017693 A | 2/2010 |

* cited by examiner

OPTICAL EMISSION SPECTROSCOPY CALIBRATION DEVICE AND SYSTEM INCLUDING THE SAME

CROSS-REFERENCE TO RELATED APPLICATION(S)

This application claims priority to Korean Patent Application No. 10-2019-0040370 filed on Apr. 5, 2019 in the Korean Intellectual Property Office, and Korean Patent Application No. 10-2019-0102604 filed on Aug. 21, 2019 in the Korean Intellectual Property Office, the disclosures of each of which are incorporated by reference herein in their entireties.

BACKGROUND

1. Field

The present disclosure relates to an optical emission spectroscopy calibration device and a system including the same.

2. Description of Related Art

In a plasma etching process, an optical emission spectroscopy (OES) method for monitoring a state of plasma in a chamber is widely used for end point detection (EPD), virtual metrology (VM), chamber abnormality detection, and the like. However, deviations may occur in optical emission spectroscopy (OES) data used for an optical emission spectroscopy as a chamber uptime increases, and/or before or after performing a preventive maintenance operation. In addition, deviations between chambers may occur in the optical emission spectroscopy (OES) data. Accordingly, research and development of OES calibration techniques for removing deviations in the optical emission spectroscopy (OES) data has been conducted.

Representative OES calibration techniques include a method of disposing a light source inside a chamber and a method of disposing a mirror inside the chamber. However, the method of disposing a light source inside the chamber has a problem in that an operation time may increase since a chamber cover must be opened and closed every time an OES calibration operation is performed. In addition, the method of disposing the mirror inside the chamber has a problem that mass production of the chamber is difficult since the chamber must be remodeled.

SUMMARY

It is an aspect to provide an optical emission spectroscopy calibration device and a system using the same, that can perform an OES calibration operation more quickly and easily.

According to an aspect of one or more example embodiments, there is provided an optical emission spectroscopy (OES) calibration system comprising a chamber including a viewport, and in which a semiconductor process using a plasma is performed; an adapter fastened to the viewport, and including a first beam splitter and a second beam splitter splitting incident light; an OES device that detects plasma light generated in the plasma and transmitted through the adapter and that generates OES data based on the detected plasma light; an OES calibration device including a light source, the OES calibration device generating correction data for compensating for deviations in the OES data; and a spectrometer that detects light emitted from the light source and split by the first beam splitter or the second beam splitter, wherein each of the OES device, the OES calibration device, and the spectrometer is fastened to the adapter through an optical cable, and the OES calibration device generates the correction data using an intensity of light detected by the spectrometer.

According to another aspect of one or more example embodiments, there is provided an optical emission spectroscopy (OES) calibration system comprising a chamber including a viewport, and in which a semiconductor process using plasma is performed; an adapter fastened to the viewport, and including a first beam splitter and a second beam splitter splitting incident light; an OES device connected to the viewport through the adapter, and detecting an optical spectrum of the plasma to generate OES data; and an OES calibration device detachably fastened to the adapter, and including a light source emitting inspection light, and a spectrometer detecting the inspection light split by the first beam splitter and the second beam splitter, wherein the first beam splitter splits the inspection light into first light in the viewport direction and second light in the OES calibration device direction, and the second beam splitter splits the inspection light into third light in the OES device direction and fourth light in the OES calibration device direction.

According to another aspect of one or more example embodiments, there is provided an optical emission spectroscopy (OES) calibration device comprising at least one light source; and at least one shutter connected to an adapter fastened to a viewport of each of a plurality of plasma chambers through an optical cable, the at least one shutter controlling each of a plurality of inspection lights generated from the at least one light source to be transmitted to the adapter of each of the plurality of plasma chambers, wherein the adapter comprises a first beam splitter and a second beam splitter fastened to a mount provided on an outer surface of the adapter and inserted into the adapter, and the first beam splitter and the second beam splitter split the incident light, and the OES calibration device detects an optical spectrum of the plurality of inspection lights that are split, and corrects OES data of each of the plurality of plasma chambers using the detected optical spectrum.

BRIEF DESCRIPTION OF DRAWINGS

The above and other aspects will be more clearly understood from the following detailed description, taken in conjunction with the accompanying drawings, in which.

DETAILED DESCRIPTION

Figure 1:
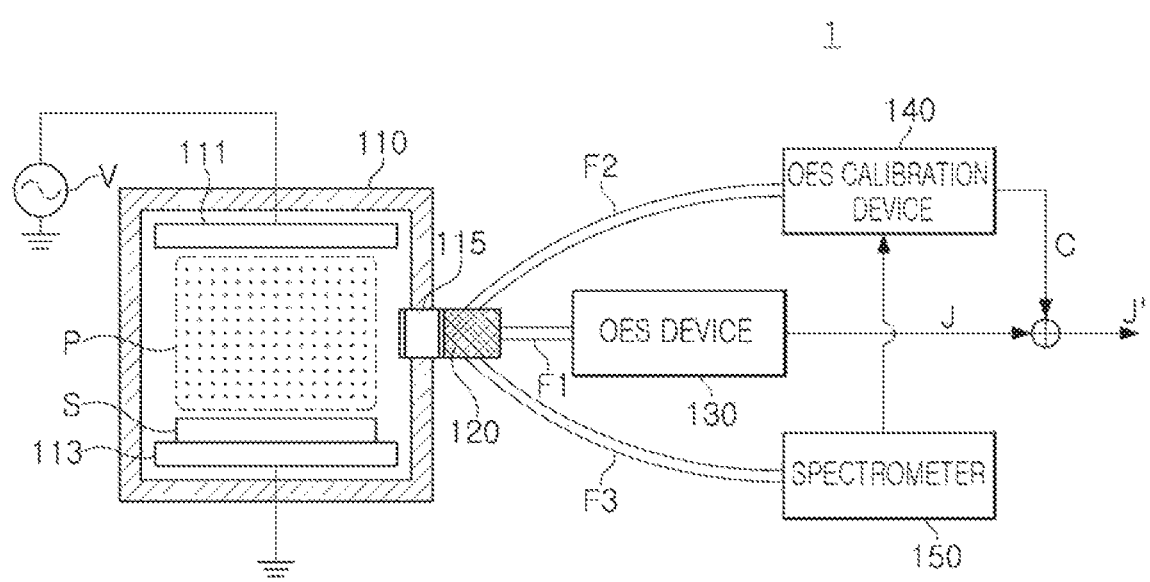
FIG. 1 is a schematic view illustrating an OES calibration system according to an example embodiment.

Hereinafter, example embodiments will be described in detail with reference to the accompanying drawings. Further, in the drawings, elements having the same functions, within the same scope, will be designated by the same reference numerals.

Figure 2A:
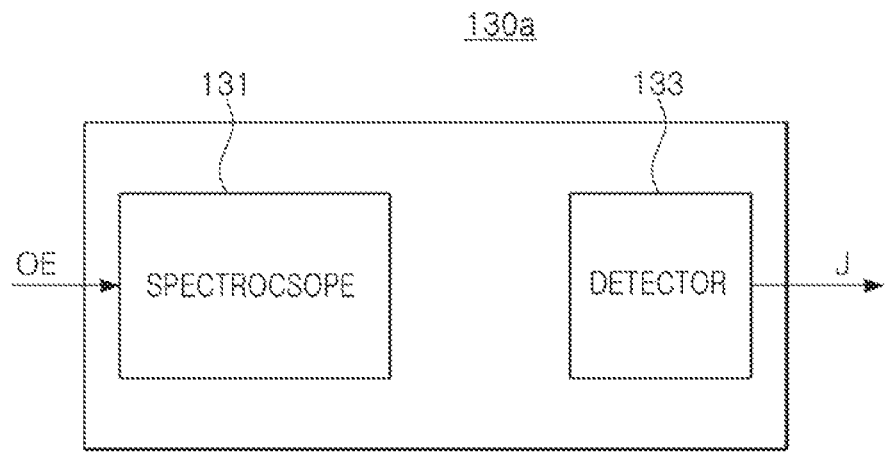
FIGS. 2A and 2B are schematic views illustrating a configuration of an optical emission spectroscope that may be applied to example embodiments.
Figure 2B:
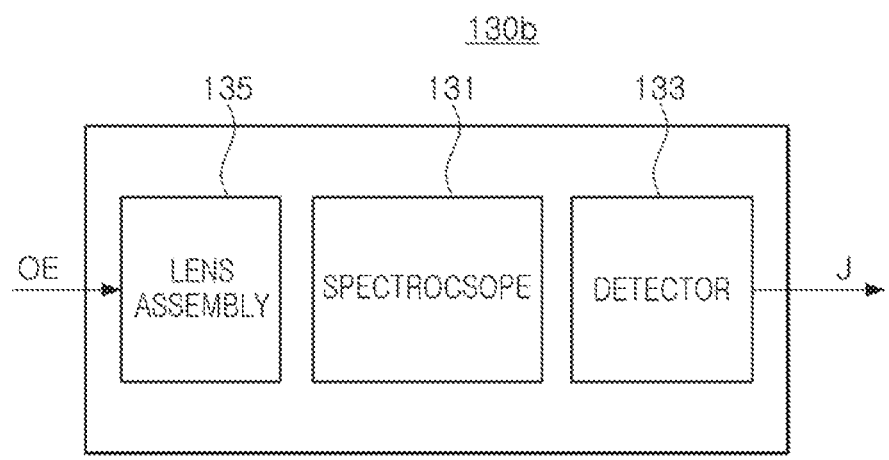
Figure 3A:
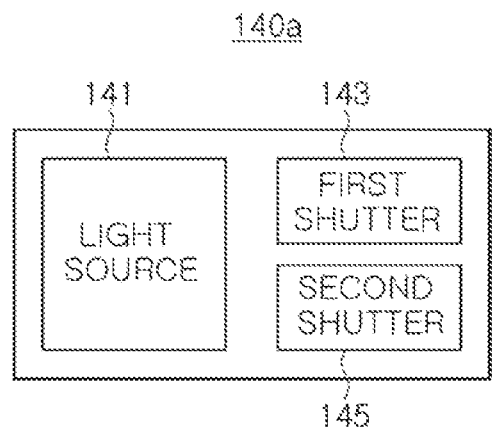
FIGS. 3A to 3C are schematic views illustrating a configuration of an OES calibration device according to an example embodiment.
Figure 3B:
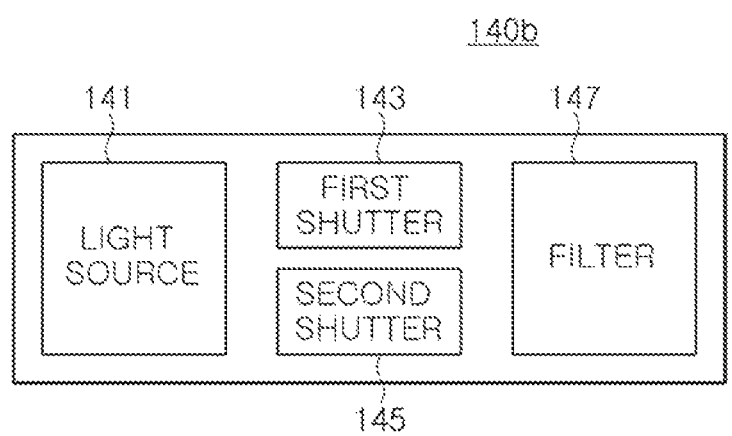
Figure 3C:
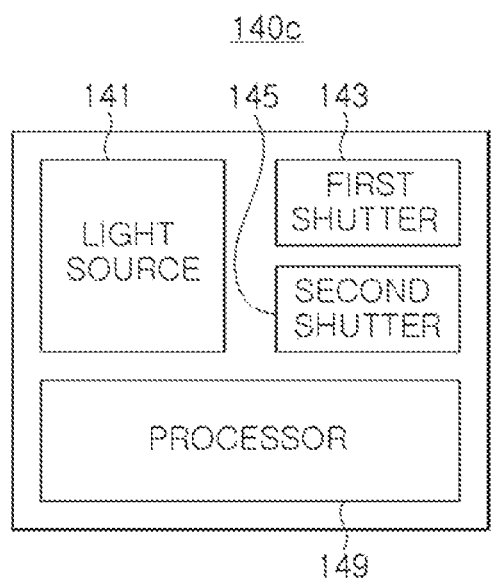

FIG. 1 is a schematic view illustrating an OES calibration system according to an example embodiment. FIGS. 2A and 2B are schematic views illustrating a configuration of an OES device that may be applied to example embodiments, and FIGS. 3A to 3C are schematic views illustrating a configuration of an OES calibration device according to an example embodiment.

An optical emission spectroscopy (OES) method is widely used as a method for determining changes in a state of plasma in a chamber. The optical emission spectroscopy (OES) method is an optical diagnostic technique that measures changes in the state of plasma by measuring light emitted from the plasma in the chamber. Light emitted from the plasma in the chamber passes through a viewport installed on a sidewall of the chamber and is transmitted to a spectrometer through an optical cable, and the light that has passed through the viewport may be measured spectrally. However, there is a problem that it is difficult to obtain a consistent measured spectrum because optical transmission characteristics are different from chamber to chamber and/or the optical transmission characteristics may change before and after performing preventive maintenance work.

On the other hand, the viewport may cause spectral deviation due to by-product accumulation on the viewport, reuse of the viewport after a cleaning process, or the like. In addition, optical transmission characteristics of an optical cable connecting the viewport and the spectrometer may change according to types of an optical fiber, a bending state of the optical cable, an alignment state of a fastening unit of the optical cable, and the like, thereby causing spectral deviation. Therefore, in the optical emission spectroscopy (OES) method, an OES calibration device is used to remove spectral deviation and improve accuracy.

The OES calibration device may be implemented using a light source and/or a mirror disposed inside the chamber, or a light source and/or a mirror fixedly mounted on the chamber. However, there is a problem that mass productivity is low and use is inconvenient. In order to solve this problem, the OES calibration device according to example embodiments may be implemented as a portable device including its own internal light source.

Referring to FIG. 1, an OES calibration system 1 may include a chamber 110, an adapter 120, and an OES device 130. In addition, the OES calibration system 1 may further include an OES calibration device 140 and a spectrometer 150.

In a chamber 110, various semiconductor processes using plasma may be performed. For example, in the chamber 110, an etching process for a substrate S may be performed using gas injected from the outside of the chamber 110. The substrate S may include a wafer substrate, a glass substrate, a plastic substrate, and the like, and may be disposed on a lower electrode 113. Gas used in the etching process may include $NF_3$, $N_2$, $O_2$, $H_2$, and the like.

The chamber 110 may include a capacitively coupled plasma (CCP)-type chamber for generating plasma by applying a RF power between an upper electrode and a lower electrode, facing each other, depending on a configuration of an inner electrode, and an inductively coupled plasma (CCP)-type chamber for generating plasma by applying a RF power to an external coil, and the like. In FIG. 1, the chamber 110 is illustrated as a capacitively coupled plasma (CCP)-type chamber, but this is merely illustrative for convenience and example embodiments are not limited thereto.

When an external power V is applied to an upper electrode 111 and a lower electrode 113 is grounded, an electric field may be formed between the upper electrode 111 and the lower electrode 113 to form plasma P inside the chamber 110.

The chamber 110 may include at least one viewport 115 for visually confirming a plasma P reaction. The viewport 115 may be provided by sealing an opening formed in a sidewall of the chamber 110 with a transparent window having excellent heat and pressure resistance characteristics. For example, the viewport 115 may include an inner window disposed adjacent to an inner sidewall of the chamber 110 and an outer window disposed adjacent to an outer sidewall of the chamber 110. In addition, the viewport 115 may be disposed between the inner window and the outer window, and may further include at least one lens for amplifying intensity of plasma P light.

The OES device 130 may be connected to the viewport 115 using the adapter 120.

When various semiconductor processes are performed using the chamber 110 (i.e., when the chamber is operated), the light emitted from the plasma P in the chamber 110 may be transmitted to the OES device 130 through the viewport 115 and a first optical cable F1. The OES device 130 may generate optical emission spectroscopy (OES) data J by measuring optical emission (OE) of the plasma P in the chamber 110. For example, the OES device 130 may detect a spectrum SP by decomposing the optical emission OE of the plasma P generated in the chamber 110 according to a wavelength. The OES device 130 may generate the optical emission spectroscopy (OES) data J by measuring an intensity of optical emission OE for each wavelength of plasma P from the detected spectrum SP.

Referring to FIG. 2A, an OES device 130a may include a spectroscope 131 and a detector 133.

The spectroscope 131 may decompose the optical emission OE of the plasma P generated in the chamber 110 according to the wavelength to detect the spectrum SP. In some example embodiments, the spectroscope 131 may include a grating or a prism, or the like. The grating may be a mirror having fine grooves, and may include mechanical gratings having mechanically generated grooves and/or holographic gratings having grooves generated by patterning a photoresist and then etching the photoresist. A wavelength resolution of the grating may be greater as the number of grooves increases.

The detector 133 may generate optical emission spectroscopy (OES) data J by measuring an intensity of the optical emission OE for each wavelength of the plasma P from the detected spectrum SP. In some example embodiments, the detector 133 may be a charge-coupled device (CCD), or a photo diode array. The detector 133 may measure the intensity of the optical emission OE based on an amount of charge generated by light.

Referring to FIG. 2B, an OES device 130b may include a spectroscope 131, a detector 133, and a lens assembly 135 for providing parallel light into the spectroscope 131.

In some example embodiments, the lens assembly 135 may include a focusing lens and a collimator lens. The focusing lens may form a point light source by focusing light incident on the OES device 130b. The collimator lens may convert the light emitted from the point light source into parallel light and transmit the converted light to the spectroscope 131.

In some example embodiments, when the spectroscope 131 is a grating, the lens assembly 135 may include a telecentric lens. The telecentric lens may convert the light incident on the OES device 130b into parallel light and transmit the converted light to microgrooves of the spectroscope 131.

For convenience of description, referring to FIG. 1, in order to perform an OES calibration operation, the OES calibration device 140 may be connected to the viewport 115 using the adapter 120.

When the OES calibration operation is performed, the light generated by the internal light source of the OES calibration device 140 may be transmitted to the adapter 120 via a second optical cable F2. The light transmitted to the adapter 120 may be split in the viewport 115 direction and the spectrometer 150 direction by a beam splitter included in the adapter 120 to be used to determine a degree of window contamination of the viewport 115. In addition, the light transmitted to the adapter 120 may be split by a beam splitter included in the adapter 120 in the OES device 130 direction and the spectrometer 150 direction from the viewport 115, and may be used to determine optical transmission characteristics.

Referring to FIG. 3A, an OES calibration device 140a may include a light source 141, a first shutter 143, and a second shutter 145.

Light emitted from the light source 141 may be transmitted to the adapter 120 according to a state of opening and closing of the first shutter 143 and the second shutter 145.

For example, when the first shutter 143 is opened, the light emitted from the light source 141 may be transmitted to a first beam splitter of the adapter 120 through the first shutter 143. The light transmitted to the first beam splitter may be split into first light in the viewport 115 direction and second light in the spectrometer 150 direction. After the first light is reflected by the inner window of the viewport 115, the first light may be transmitted to the spectrometer 150 again through the first beam splitter. The spectrometer 150 may generate first optical emission spectroscopy (OES) data J1 by measuring an intensity of the first light. In addition, the second light may be transmitted to the spectrometer 150 through the first beam splitter. The spectrometer 150 may generate second optical emission spectroscopy (OES) data J2 by measuring an intensity of the second light. The first optical emission spectroscopy (OES) data J1 and the second optical emission spectroscopy (OES) data J2 may be transmitted to the OES calibration device 140a, and may be used to generate correction data C to correct the optical emission spectroscopy (OES) data.

When the second shutter 145 is opened, the light emitted from the light source 141 may be transmitted to the second beam splitter of the adapter 120 through the second shutter 145. The light transmitted to the second beam splitter may be split to third light in the OES device 130 direction and fourth light in the spectrometer 150 direction. The OES device 130 may generate third optical emission spectroscopy (OES) data J3 by measuring an intensity of the third light. In addition, the spectrometer 150 may generate fourth optical emission spectroscopy (OES) data J4 by measuring an intensity of the fourth light. The third optical emission spectroscopy (OES) data J3 and the fourth optical emission spectroscopy (OES) data J4 may be transmitted to the OES calibration device 140a, and may be used to generate correction data C to correct the optical emission spectroscopy (OES) data.

In some example embodiments, the OES calibration device 140a may perform a spectroscopic reflectometry using the first optical emission spectroscopy (OES) data J1 and the second optical emission spectroscopy (OES) data J2 to generate a first correction data C1. For example, the OES calibration device 140a may generate the first correction data C1 by measuring a deviation in the intensity of the first light based on intensity of the second light. The deviation of the intensity of the first light and the second light may be proportional to a degree of contamination of the window of the viewport 115. Light loss of light emitted from the plasma P may occur according to the degree of contamination of the window of the viewport 115, and the first correction data C1 may be used to compensate the deviation in the optical emission spectroscopy (OES) data J due to the light loss.

In some example embodiments, the OES calibration device 140a may generate first correction data C1 based on the first optical emission spectroscopy (OES) data J1 and fourth optical emission spectroscopy (OES) data J4. For example, the OES calibration device 140a may generate first correction data C1, by measuring a deviation in the intensity of the first light based on the intensity of the fourth light.

In some example embodiments, the OES calibration device 140a may generate second correction data C2 based on the third optical emission spectroscopy (OES) data J3 and the fourth optical emission spectroscopy (OES) data J3. For example, the OES calibration device 140a may generate the second correction data C2 by measuring the deviation in the intensity of the third light based on the intensity of the fourth light. For example, the OES calibration device 140a may generate the second correction data C2 by measuring the deviation in the intensity of the third light based on the intensity of the fourth light.

Referring to FIG. 3B, an OES calibration device 140b may include a light source 141, a first shutter 143, and a second shutter 145. In addition, the OES calibration device 140b may further include a filter for 147 filtering the light emitted from the light source 141.

The filter 147 may include at least one optical filter. For example, the filter 147 may include a neutral density (ND) filter, a bandpass filter, and the like.

The closer the ND filter is to the center of the filter, the lower the light transmittance. For example, when incident light passes through the ND filter, the light transmittance at the center of the filter may be low and the light transmittance at an outside of the filter may be high. Therefore, when incident light having a greater intensity at the center of the filter than at the outside of the filter passes through the ND filter, overall uniform light may be generated due to the light transmittance characteristics of the ND filter.

The bandpass filter may pass only light components having a wavelength within a specific band of incident light. For example, the bandpass filter may selectively pass only light components included in an ultraviolet region in the incident light. In addition, the bandpass filter may selectively pass only light components having a wavelength in a specific ultraviolet region, such as 300 nm to 350 nm, in the incident light.

In some example embodiments, the bandpass filter may be a multi bandpass filter having a plurality of light transmission bands. The plurality of light transmission bands may correspond to different wavelength bands, or may correspond to wavelength bands at least partially overlapping each other. For example, the bandpass filter may penetrate a first light component having a wavelength of 250 nm to 300 nm and a second light component having a wavelength of 350 nm to 400 nm.

Referring to FIG. 3C, an OES calibration device 140c may include a light source 141, a first shutter 143, and a second shutter 145. In addition, unlike the example embodiments illustrated in FIGS. 3A and 3B, the OES calibration device 140c may further include a processor 149 for generating correction data C. In some example embodiments, the processor 149 may include one or more microprocessors.

The processor 149 may control an overall operation of the OES calibration device 140, and may generate the correction data C that is used to compensate for the deviations in the optical emission spectroscopy (OES) data J. For example, the processor 149 may generate the first correction data C1 based on the degree of contamination of the window of the viewport 115 and the second correction data C2 based on the optical transmission characteristic reaching the OES device 130 by using a measured value detected by the spectrometer 150. The processor 149 may generate the correction data C to compensate for the deviations in the optical emission spectroscopy (OES) data J using the first correction data C1 and the second correction data C2. For example, the processor 149 may generate the correction data C by combining the first correction data C1 and the second correction data C2 in a frequency domain.

As described above, the OES calibration devices 140a to 140c according to some example embodiments may be implemented separately from the spectrometer 150 to minimize the size and weight, and thus may be implemented as a small portable device that is easy for installing and transporting. In addition, the OES calibration devices 140a to 140c may be implemented to be assembled or detached from the adapter 120 directly or through an optical cable, and may be used in another chamber in which an adapter having the same size as that of the adapter 120 is fastened. It should be noted that, in some example embodiments, the OES calibration device 140b may also include a processor as illustrated in the OES calibration device 140c.

For convenience of description, referring to FIG. 1, the adapter 120 may be fastened to the viewport 115 to pass or split the incident light.

The adapter 120 may pass light emitted from the plasma P in the chamber 110 when operating the chamber, and may split light emitted from the internal light source of the OES calibration device 140 during the OES calibration operation. For example, during the chamber operation, the adapter 120 may function as a path through which the light emitted from the plasma P passes between the viewport 115 and the OES device 130. During the OES calibration operation, the adapter 120 may split light emitted from an internal light source of the OES calibration device 140.

Figure 4:
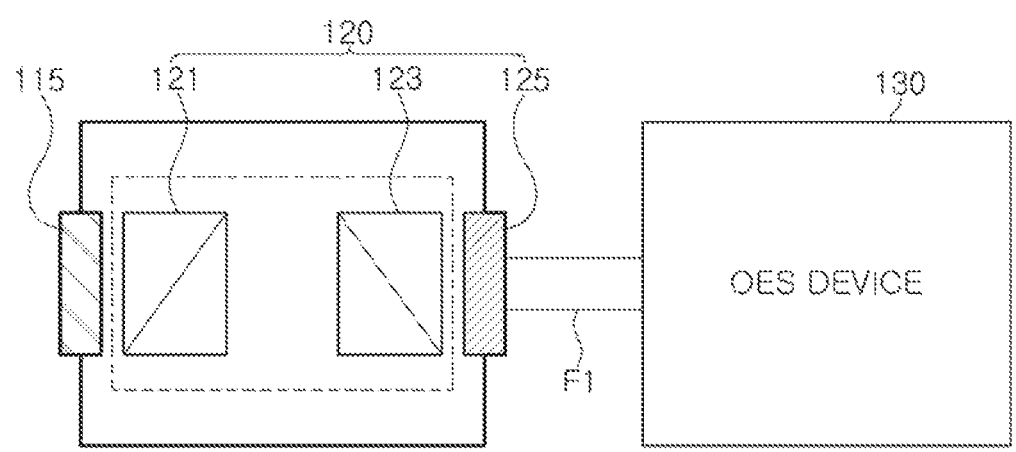
FIG. 4 is a schematic view illustrating a configuration of an adapter according to an example embodiment.

FIG. 4 is a schematic view illustrating a configuration of an adapter according to an example embodiment. Referring to FIG. 4, together with FIG. 1, the adapter 120 may include a first beam splitter 121 and a second beam splitter 123 for splitting light incident from the OES calibration device 140 during an OES calibration operation.

The first beam splitter 121 and the second beam splitter 123 may be connected to an optical output terminal of the OES calibration device 140 through an optical cable F2, and may receive light emitted from the internal light source of the OES calibration device 140.

In some example embodiments, the first beam splitter 121 may split the light incident from the OES calibration device 140 in the viewport 115 direction and the spectrometer 150 direction. The light split in the viewport 115 direction may be reflected by the inner window of the viewport 115 and then transmitted to the spectrometer 150 via the first beam splitter 121. The light split in the spectrometer 150 direction may be used as the first reference light for determining a degree of contamination of the window of the viewport 115.

In some example embodiments, the second beam splitter 123 may split light incident from the OES calibration device 140 in the OES device 130 direction and the spectrometer 150 direction. The light split in the spectrometer 150 direction may be used as second reference light for determining the light transmission characteristic to the OES device 130.

The first beam splitter 121 and the second beam splitter 123 may be implemented as various types of modules attachable and detachable to and from the adapter 120. For example, the first beam splitter 121 and the second beam splitter 123 may be implemented as one module, and may be fastened to the adapter 120 for an OES calibration operation. In addition, the first beam splitter 121 and the second beam splitter 123 may be implemented as separate modules, respectively, and may be fastened to the adapter 120 for an OES calibration operation.

The adapter 120 may include various fasteners capable of receiving the first beam splitter 121 and the second beam splitter 123. For example, the first beam splitter 121 and the second beam splitter 123 may be fastened to a mount provided on a portion of the outer surface of the adapter 120, and may have a structure in which the first beam splitter 121 and the second beam splitter 123 are inserted into the adapter 120.

Hereinafter, an operation method of the OES calibration system and a generation process of the correction data C will be described in detail with reference to FIGS. 5A, 5B, and 6.

Figure 5A:
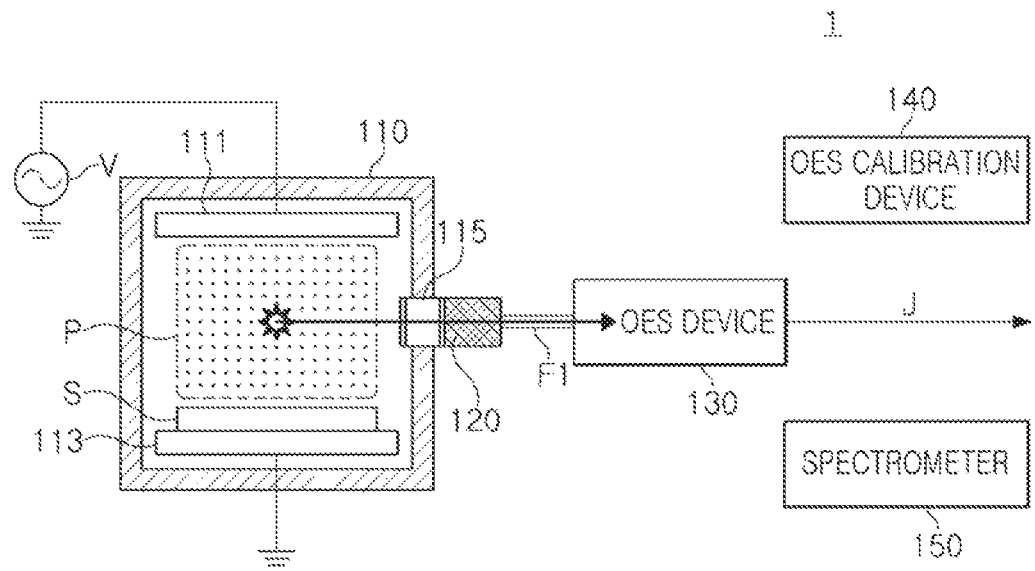
FIGS. 5A and 5B are views illustrating a method of operating an OES calibration system according to an example embodiment.
Figure 5B:
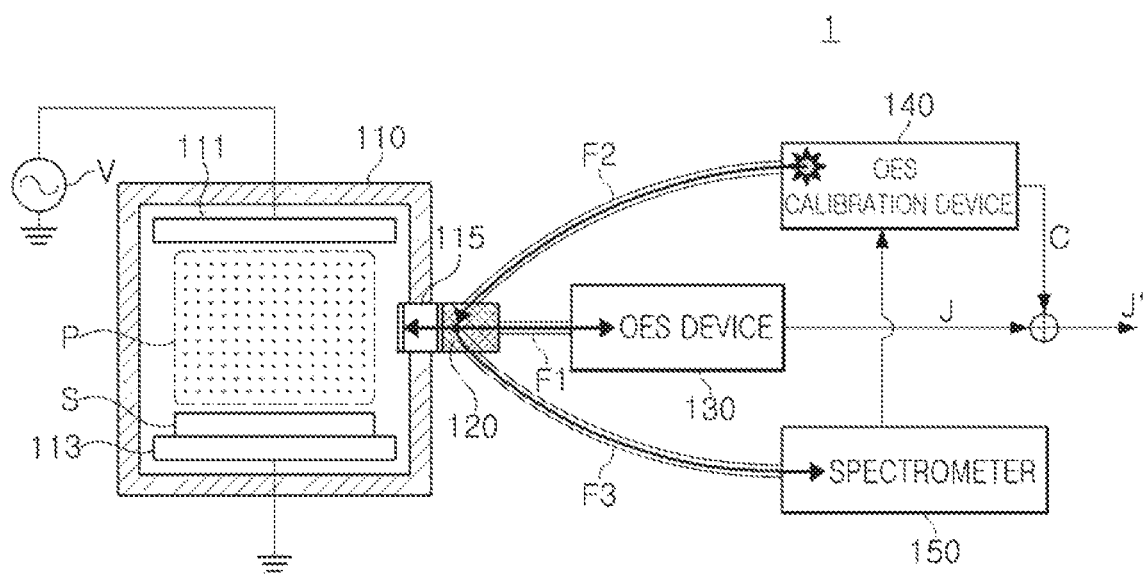

FIGS. 5A and 5B are views illustrating a method of operating an OES calibration system according to an example embodiment. FIG. 5A illustrates an optical transmission direction inside the system during the chamber operation, and FIG. 5B illustrate a light transmission direction inside the system during the OES calibration operation.

Referring to FIG. 5A together with FIG. 4, only the OES device 130 may be connected to the adapter 120, during the chamber operation. In this configuration, the light emitted from the plasma P in the chamber 110 may be transmitted to the OES device 130 through the first optical cable F1 via the viewport 115 and the adapter 120. The adapter 120 may pass incident light in the OES device 130 direction while the first beam splitter 121 and the second beam splitter 123 are not mounted or while the function of the first beam splitter 121 and the second beam splitter 123 is deactivated.

Referring to FIG. 5B together with FIG. 4, during the OES calibration operation, both the OES device 130 and the OES calibration device 140 may be connected to the adapter 120. In this configuration, the light emitted from the internal light source of the OES calibration device 140 may be transmitted to the adapter 120 through the second optical cable F2. The adapter 120 may perform a function of splitting incident light while the first beam splitter 121 and the second beam splitter 123 are mounted or while the function of the first beam splitter 121 and the second beam splitter 123 is activated. For example, the first beam splitter 121 may split the light transmitted from the OES calibration device 140 in the viewport 115 direction and the spectrometer 150 direction. In addition, the second beam splitter 123 may split the light transmitted from the OES calibration device 140 in the OES device 130 direction and the spectrometer 150 direction. The light transmitted from the adapter 120 to the spectrometer 150 may be used as reference light for determining the degree of contamination of the window of the viewport 115 and/or the light transmission characteristic to the OES device 130.

Figure 6:
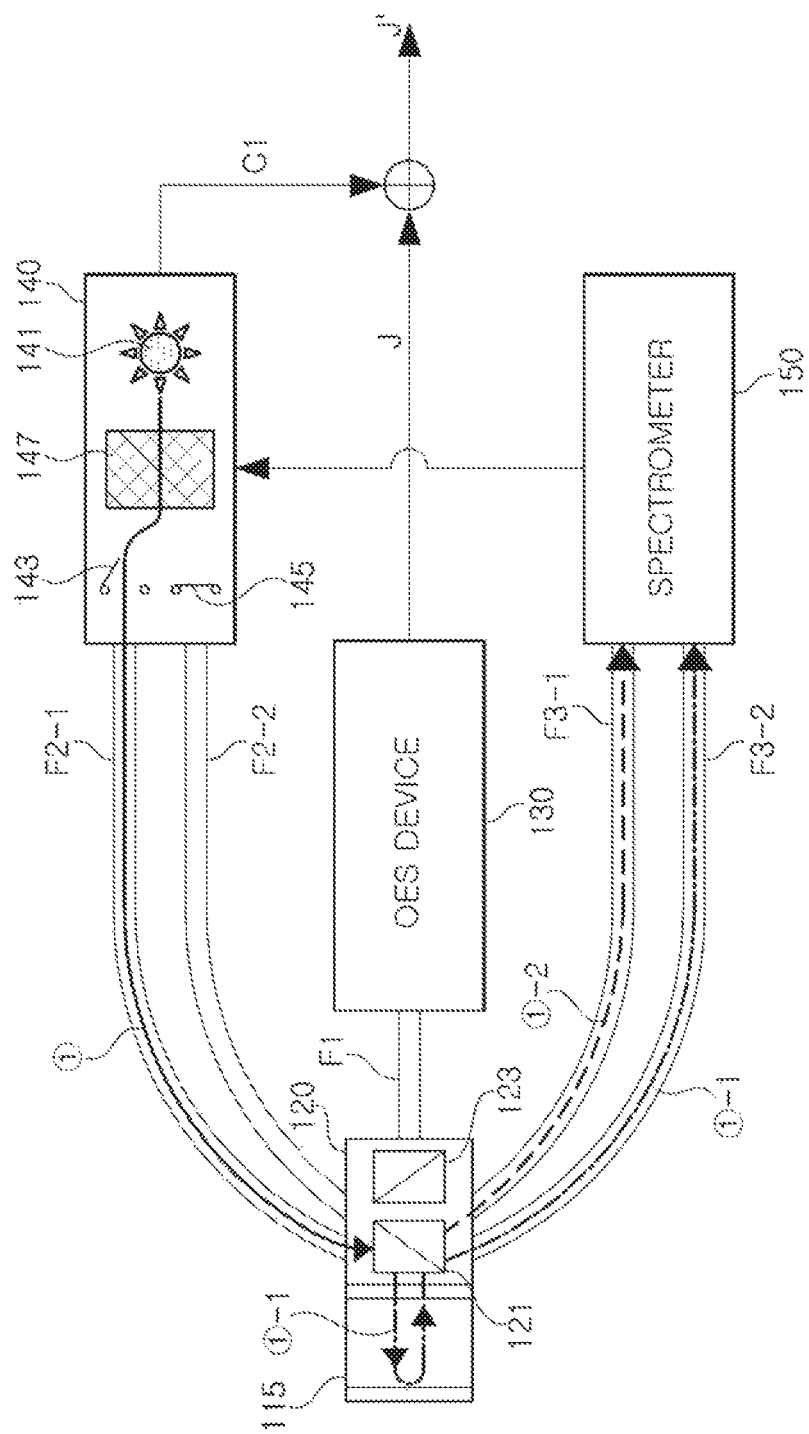
FIG. 6 is a view illustrating a process of generating first correction data according to a state of a viewport by the OES calibration device, according to an example embodiment.
Figure 7:
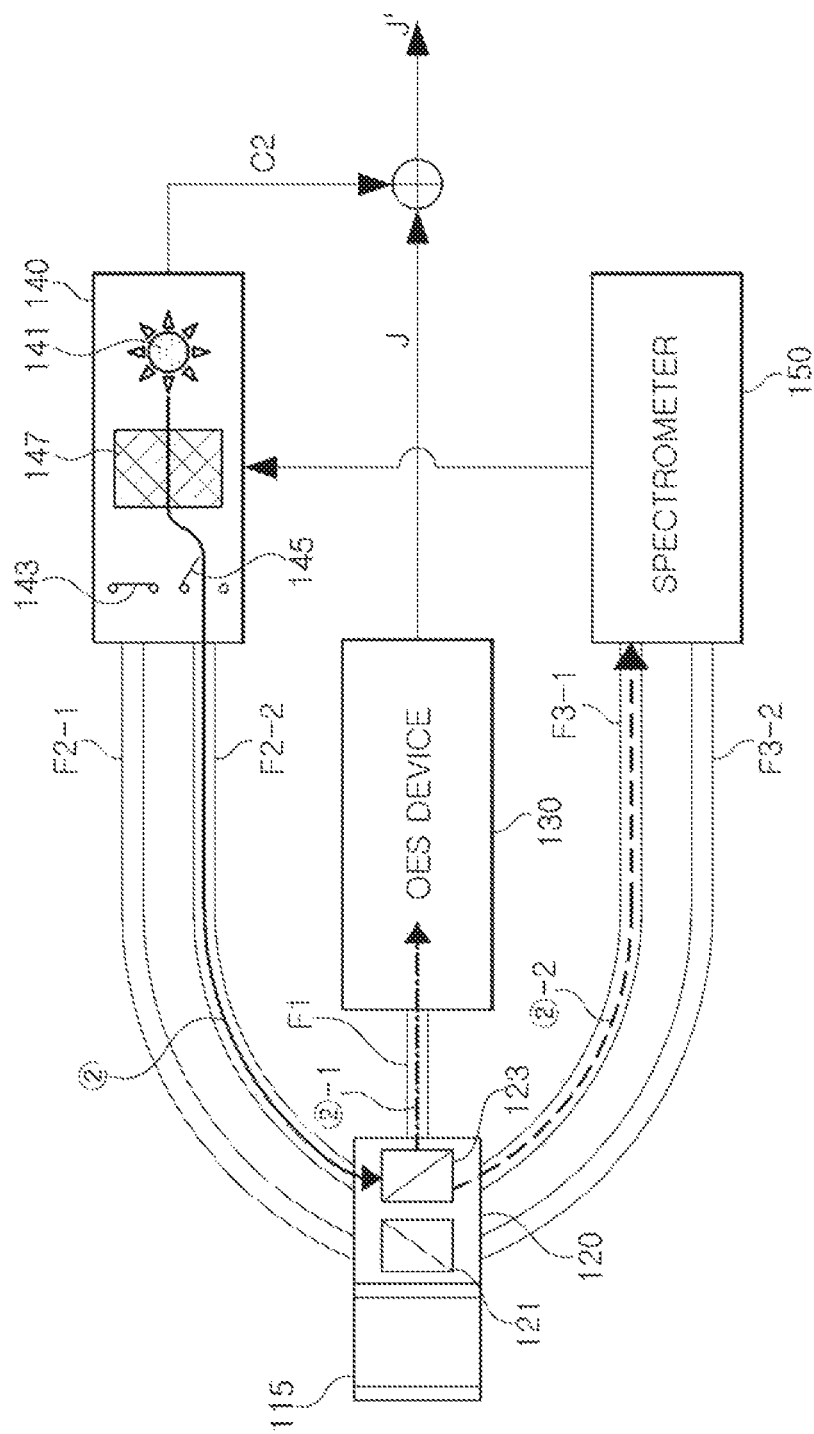
FIG. 7 is a view illustrating a process of generating second correction data according to optical path transmission characteristics by the OES calibration device, according to an example embodiment.

FIG. 6 is a view illustrating a process of generating first correction data according to a degree of contamination of a window of a viewport by an OES calibration device according to an example embodiment, and FIG. 7 is a view illustrating a process of generating second correction data according to a light transmission characteristic by an OES calibration device according to an example embodiment.

Referring to FIG. 6, when a first shutter 143 of the OES calibration device 140 is opened, light ① generated by an internal light source 141 of the OES calibration device 140 may be transmitted to a first beam splitter 121 of the adapter 120 through an optical cable F2-1. The first beam splitter 121 may split the incident light into first light ①-1 in the viewport 115 direction and the second light ①-2 in the spectrometer 150 direction.

The first light ①-1 may be reflected form the inner window of the viewport 115 and then transmitted to the spectrometer 150 through an optical cable F3-2.

The second light ①-2 may be detected by the spectrometer 150, and may be used as reference light for determining a degree of contamination of a window of the viewport 115.

The intensity of each wavelength of the first light ①-1 and the second light ①-2 measured by the spectrometer 150 may be transmitted to the OES calibration device 140, and may be used to generate the first correction data C1 for compensating for deviations in the optical emission spectroscopy (OES) data G.

Referring to FIG. 7, when the second shutter 145 of the OES calibration device 140 is opened, light ② generated by the internal light source 141 of the OES calibration device 140 may be transmitted to the second beam splitter 123 of the adapter 120 through an optical cable F2-2. The second beam splitter 123 may split the incident light into third light ②-1 in the OES device 130 direction and fourth light ②-2 in the spectrometer 150 direction.

The third light ②-1 may be transmitted to the OES device 130 through the optical cable F1, and may be used to determine the light transmission characteristic (for example, a degree of optical loss) according to a fastening state and/or a bending state of the optical cable F1.

The fourth light ②-2 may be transmitted to the spectrometer 150 through an optical cable F4, and may be used as reference light for determining the light transmission characteristic to the OES device 130.

Figure 8A:
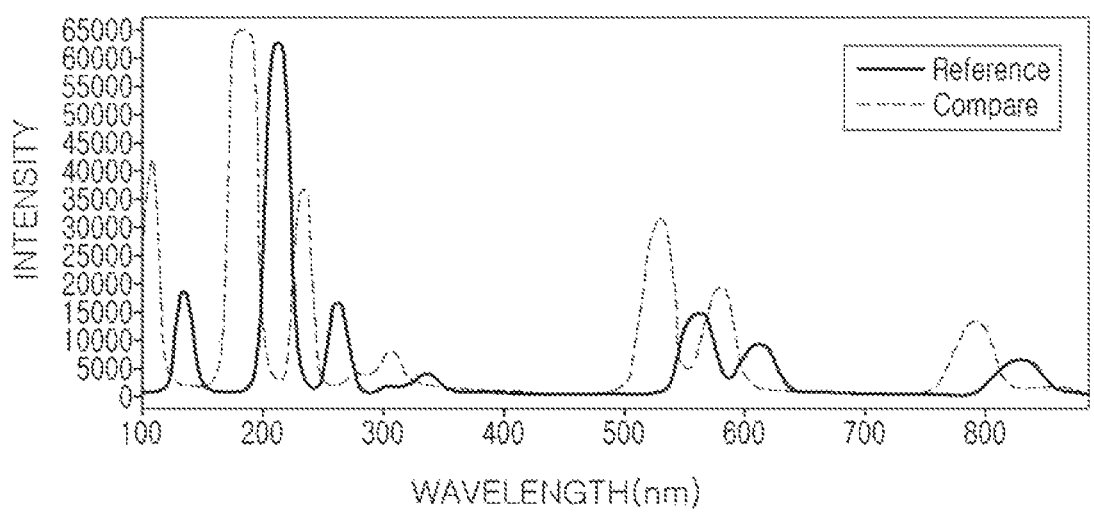
FIGS. 8A and 8B are views illustrating simulation results of changes in light emission spectrums before and after preventive maintenance, according to example embodiments.
Figure 8B:
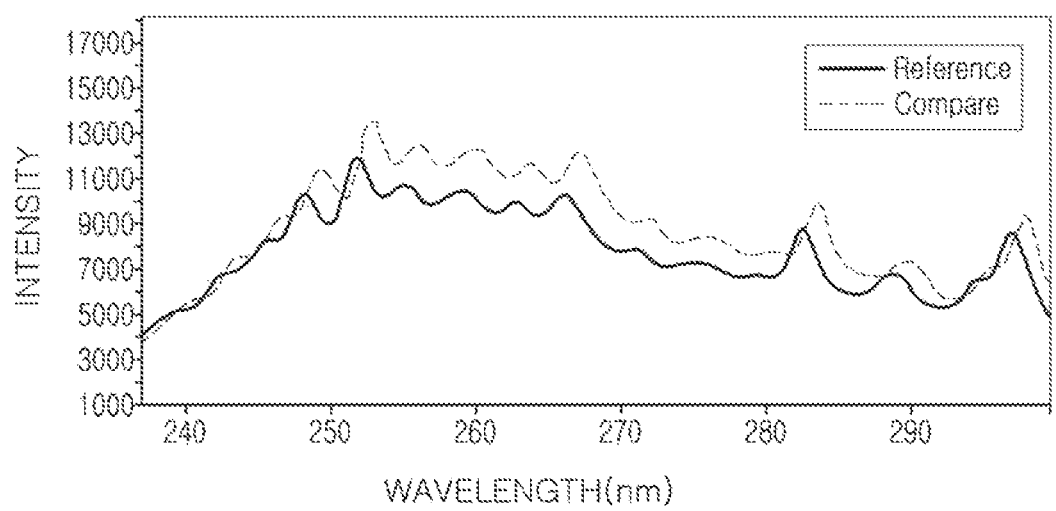

FIGS. 8A and 8B are views illustrating changes in the optical emission (OE) spectrum of the plasma P according to preventive maintenance work on the chamber, according to example embodiments.

In FIGS. 8A and 8B, a horizontal axis represents a wavelength of a spectrum, and a vertical axis represents an intensity of the spectrum. In addition, a solid line represents a reference spectrum as an optical emission (OE) spectrum before the preventive maintenance work, and a dotted line represents an optical emission (OE) spectrum after the preventive maintenance work.

Referring to FIG. 8A, the intensity of the light emission spectrum of the plasma generated in the chamber may vary before and after performing the preventive maintenance work on the chamber. In addition, referring to FIG. 8B, a wavelength band of the light emission spectrum of the plasma generated in the chamber may shift before and after performing the preventive maintenance work on the chamber. Thus, when the measured light emission spectrum and a reference spectrum do not coincide, the OES calibration device may generate correction data for compensating for the deviations in the optical emission spectroscopy (OES) data. The reference spectrum may be predetermined.

In some example embodiments, the OES calibration device may generate correction data of the optical emission spectroscopy (OES) data, when a peak value of the measured light emission spectrum increases by more than a threshold (e.g., 0.01%) relative to the reference spectrum. The threshold may be predetermined. In some example embodiments, the OES calibration device may generate correction data of the optical emission spectroscopy (OES) data, when a cumulative error of the measured light emission spectrum is more than a threshold (e.g., 0.1%). The threshold may be predetermined.

Figure 9:
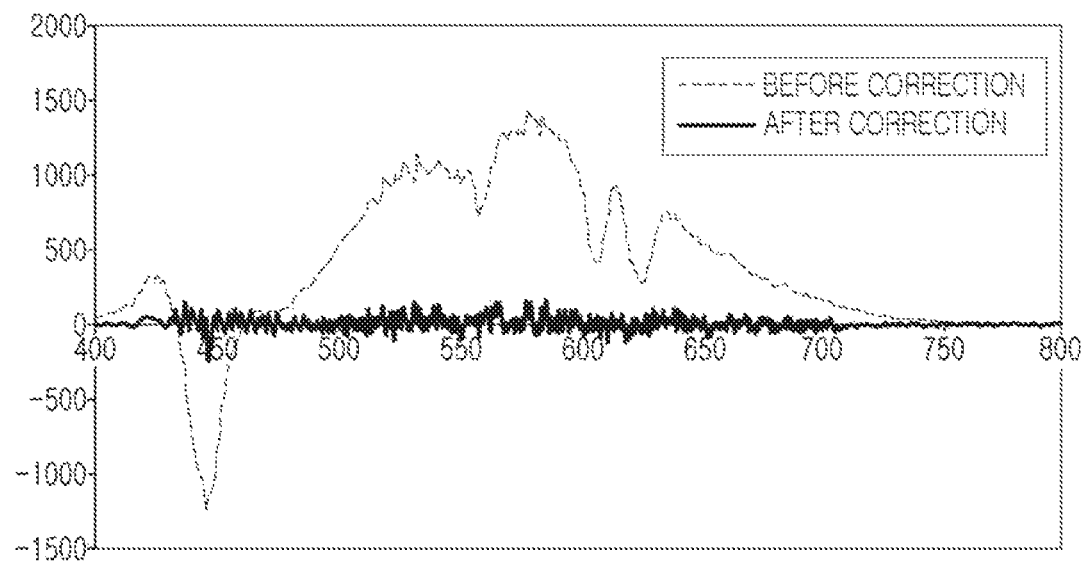
FIG. 9 is a view illustrating a simulation result of change in a light emission spectrum according to an OES calibration operation, according to an example embodiment.

FIG. 9 is a view illustrating a simulation result of a change in a light emission spectrum according to an OES calibration operation, according to an example embodiment.

In FIG. 9, a horizontal axis represents a wavelength of the spectrum, and a vertical axis represents an error of an intensity of the spectrum. In addition, a dotted line represents a light emission spectrum before the OES calibration operation, and a solid line represents a light emission spectrum after the OES calibration operation.

Referring to FIG. 9, before the OES calibration operation, the intensity of the light emission spectrum may have an error compared to a reference spectrum. The reference spectrum may be predetermined. The OES calibration device according to an example embodiment may compensate for such an error by performing the OES calibration operation. In some example embodiments, the OES calibration device may repeat the OES calibration operation, until a cumulative error of the light emission spectrum is less than a threshold (e.g., 0.1%). The threshold may be predetermined.

Figure 10:
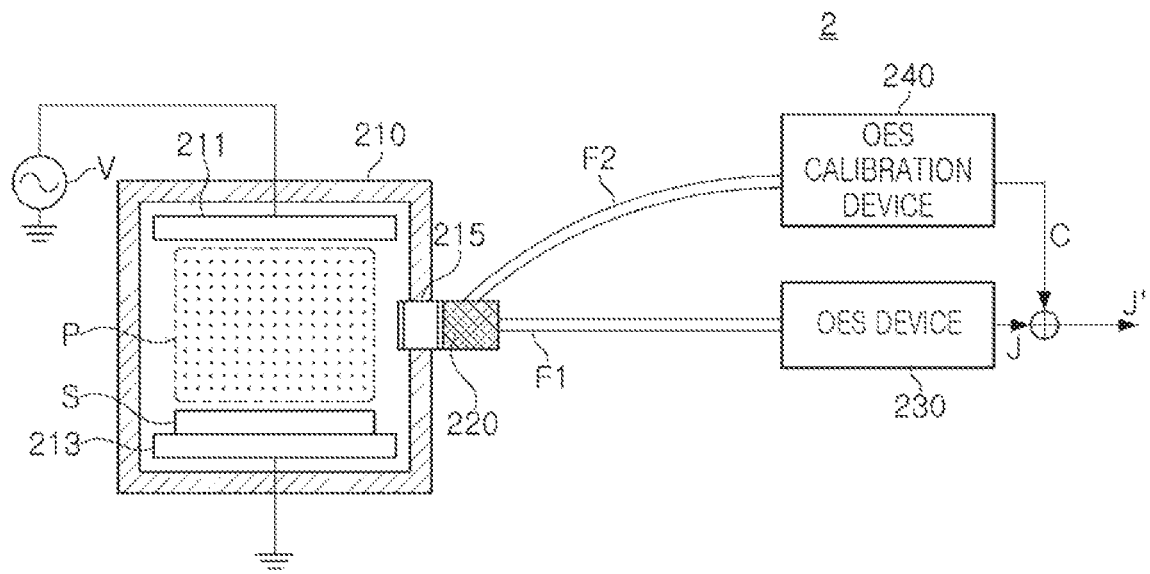
FIG. 10 is a schematic view illustrating an OES calibration system according to an example embodiment.
Figure 11:
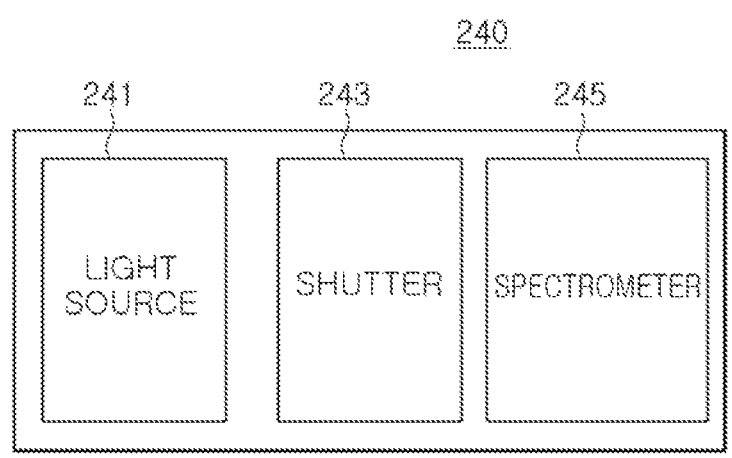
FIG. 11 is a schematic view illustrating a configuration of an OES calibration device according to an example embodiment.

FIG. 10 is a schematic view illustrating an OES calibration system according to an example embodiment, and FIG. 11 is a schematic view illustrating a configuration of an OES calibration device according to an example embodiment.

Referring to FIG. 10, an OES calibration system 2 may include a chamber 210, an adapter 220, an OES device 230, and an OES calibration device 240.

Unlike the OES calibration system 1 of FIG. 1, the OES calibration device 240 may be equipped with a spectrometer for detecting light emitted from an internal light source, inside the OES calibration device 240. Referring to FIG. 11, the OES calibration device 240 may include a light source 241, a shutter 243, and a spectrometer 245.

The OES calibration device 240 may generate first correction data C1 based on a degree of contamination of the window of the viewport 215 and second correction data C2 based on the light transmission characteristic reaching the OES device 130. The OES calibration device 240 may generate correction data C for correcting the optical emission spectroscopy (OES) data J using the first correction data C1 and the second correction data C2. For example, the OES calibration device 240 may generate the correction data C by combining the first correction data C1 and the second correction data C2 in the frequency domain.

In FIG. 10, although a case in which the adapter 220 and the OES calibration device 240 are connected by using one optical cable F2 is illustrated, this is merely an example. In some example embodiments, the adapter 220 and the OES calibration device 240 may be connected using a plurality of optical cables. For example, the adapter 220 and the OES calibration device 240 may be connected using two optical cables according to a diagnosis target or according to the number of optical paths.

The OES calibration device 240 may further include at least one optical filter for filtering the light emitted from the light source 241. For example, the OES calibration device 240 may include an ND filter, a bandpass filter, and the like, and the detailed description is the same as described above with reference to FIG. 3B.

In addition, the OES calibration device 240 may further include a processor. The processor may control an overall operation of the OES calibration device 240, and may generate correction data C for correcting the optical emission spectroscopy (OES) data J using the measured values of the spectrometer 245.

As described above, the OES calibration device 240 according to an example embodiment may include the spectrometer 245, and thus may be integrally implemented without a need for a separate spectrometer. In addition, the OES calibration device 240 may be implemented to be coupled to and separated from the adapter 220 directly or through an optical cable F2, and may be used in the OES calibration operation of another chamber having an adapter of the same size as the adapter 220.

Figure 12:
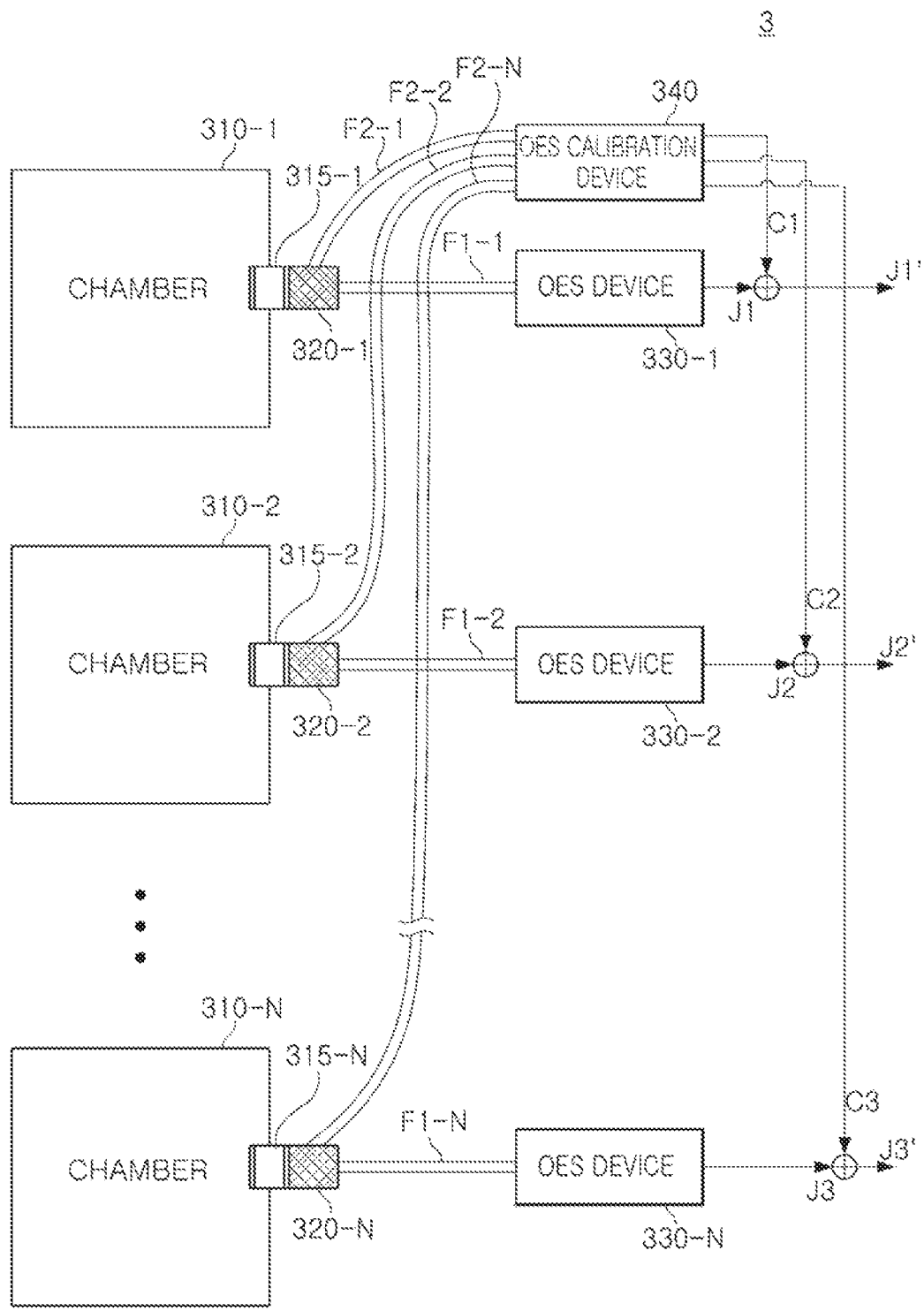
FIG. 12 is a schematic view illustrating an OES calibration system according to an example embodiment.

FIG. 12 is a schematic view illustrating an OES calibration system according to an example embodiment.

Referring to FIG. 12, unlike the systems 1 and 2 of FIGS. 1 and 10, an OES calibration system 3 may include a plurality of chambers 310-1 to 310-N, a plurality of OES devices 330-1 to 330-N, connected to the plurality of chambers 310-1 to 310-N, respectively, and one OES calibration device 340 commonly connected to the plurality of chambers 310-1 to 310-N.

The OES calibration system 3 may occupy a minimum of space and easily be built by using only one OES calibration device 340 without having to have a separate OES calibration device in each of the plurality of chambers 310-1 to 310-N.

The OES calibration device 340 may measure the degree of contamination of the window of the viewports 315-1 to 315-N of each of the plurality of chambers 310-1 to 310-N and optical transmission characteristics to each of plurality of OES devices 330-1 to 330-N. To this end, the OES calibration device 340 may include a plurality of light sources and shutters proportional to the number of the plurality of chambers 310-1 to 310-N. Alternately, the OES calibration device 340 may include one light source, and may include a multiplexer for distributing light emitted from the light source to each of the plurality of chambers 310-1 to 310-N.

Figure 13A:
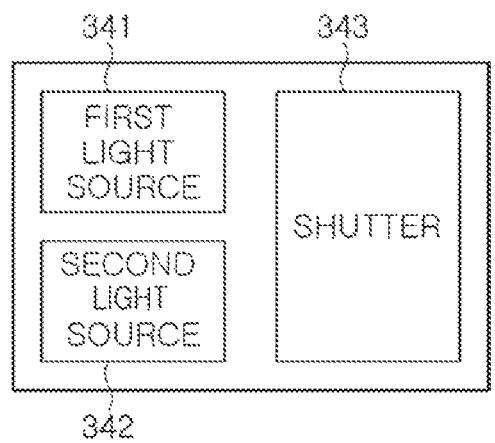
FIGS. 13A and 13B are schematic views illustrating a configuration of an OES calibration device according to an example embodiment.
Figure 13B:
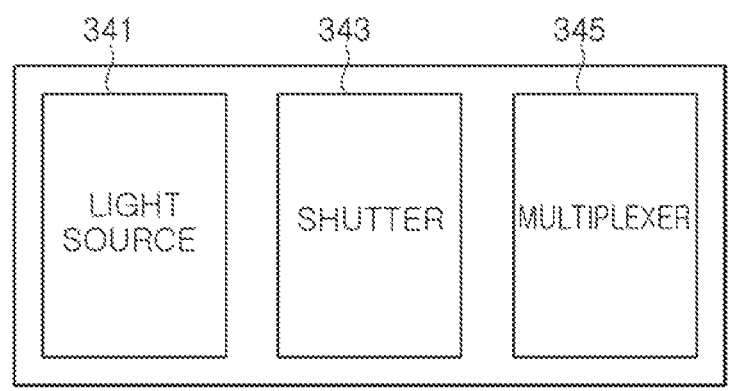

FIGS. 13A and 13B are views schematically illustrating a configuration of an OES calibration device according to an example embodiment.

Referring to FIG. 13A, an OES calibration device 340*a* may include a first light source 341, a second light source 342, and a shutter 343. Although FIG. 13A illustrates that the OES calibration device 340*a* is implemented separately from the spectrometer, this is merely an example, and in some example embodiments, the OES calibration device 340*a* may include a spectrometer as described above with reference to FIG. 11.

The first light source 341 and the second light source 342 may emit light having a different brightness or wavelength regions. For example, the first light source 341 may emit light having a first wavelength region, and may be used to perform an OES calibration operation for the first chamber 310-1. The second light source 342 may emit light having a second wavelength region, different from the first wavelength region, and may be used to perform an OES calibration operation for the second chamber 310-2.

The shutter 345 may include a plurality of shutters according to the number of optical paths to the chamber or the adapter to be determined. For example, as described above with reference to FIGS. 3A to 3C, the shutter 345 may include a first shutter for transmitting light emitted from the internal light source to the first beam splitter of the adapter 320, and a second shutter for transmitting light emitted from the internal light source to the second beam splitter of the adapters 320-1 to 320-N. In some example embodiments, the first shutter and the second shutter may be alternately turned on/off.

Referring to FIG. 13B, the OES calibration device 340*b* may include a light source 341, a shutter 343, and a multiplexer 345.

Unlike the configuration of FIG. 13A, the OES calibration device 340*b* may generate correction data C for compensating for deviations in the optical emission spectroscopy (OES) data by dividing the light emitted from one light source 341 into a plurality of lights using the multiplexer 345, and transmitting the lights to each of chambers 310-1 to 310-N through the shutter 343.

In some example embodiments, the multiplexer 345 may divide the light emitted from one light source 341 into a plurality of light having different wavelength regions and transmit the light to each of the chambers 310-1 to 310-N. For example, the multiplexer 345 may transmit light having a wavelength of a first range to the first chamber 310-1, and transmit light having a wavelength in a second range to the second chamber 310-2. Similarly, the multiplexer 345 may transmit light having a wavelength of a Nth range to a Nth chamber 310-N.

In some example embodiments, the multiplexer 345 may divide the light emitted from one light source 341 into a plurality of lights having different time periods and transmit the lights to each of the chambers 310-1 to 310-N. For example, the multiplexer 345 may transmit the light emitted from the light source 341 to the first chamber 310-1 in a time period $T_1$, and may transmit the light emitted from the light source 341 to the second chamber 310-2 in a time period T2. Similarly, the multiplexer 345 may transmit the light emitted from the light source 341 to the Nth chamber 310-N in a time period TN.

As described above, an OES calibration system 3 according to an example embodiment may perform an OES calibration operation by using one OES calibration device 340 simultaneously connected to the plurality of chambers 310-1 to 310-N. As a result, a space and cost required of a system may be minimized.

Figure 14:
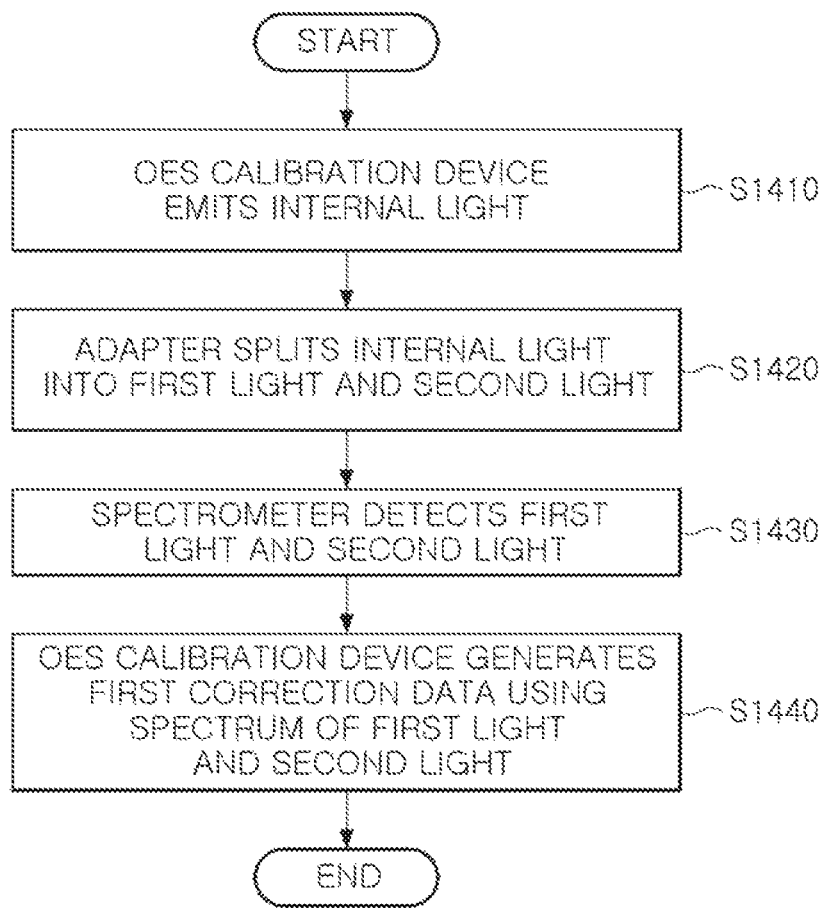
FIGS. 14 and 15 are flowcharts illustrating a method of operating an OES calibration system according to example embodiments.
Figure 15:
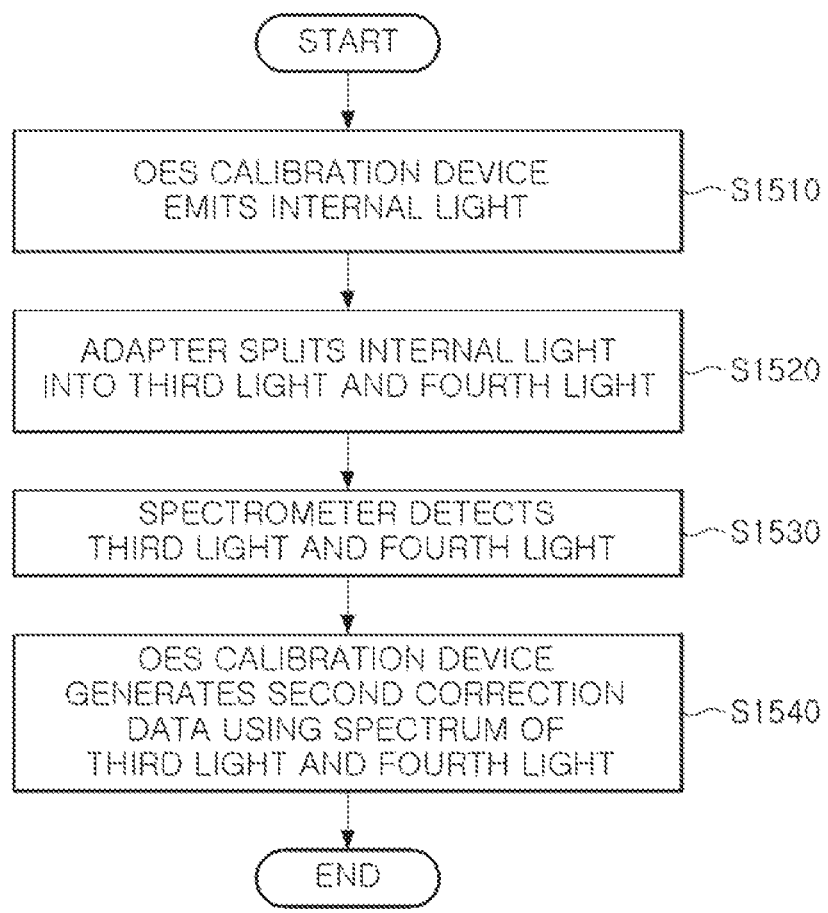

FIGS. 14 and 15 are flowcharts illustrating a method of operating an OES calibration system according to an example embodiment. FIG. 14 illustrates a process of generating a first correction data, and FIG. 15 illustrates a process of generating a second correction data.

Referring to FIG. 14, in an operation S1410, light emitted from an internal light source of the OES calibration device may be transmitted to the first beam splitter of the adapter.

In an operation S1420, the first beam splitter of the adapter may split the incident light into first light in the viewport direction and second light in the spectrometer direction.

In an operation S1430, the spectrometer may detect the first light and the second light reflected from the inner window of the viewport to measure an intensity and a wavelength of the light.

In an operation S1440, the OES calibration device may generate first correction data according to a degree of contamination of the window of the viewport by calculating the deviation in the intensity of each wavelength of the first light by using the second light measured by the spectrometer as the reference light. The generated first correction data may be used compensate for a deviation in the optical emission spectroscopy (OES) data output by the OES device.

Referring to FIG. 15, in an operation S1510, the light emitted from the internal light source of the OES calibration device may be transmitted to the second beam splitter of the adapter.

In an operation S1520, the second beam splitter of the adapter may split the incident light into third light in the OES device direction and the fourth light in the spectrometer direction.

In an operation S1530, the spectrometer may detect the third light and the fourth light to measure intensity and wavelength of the light.

In an operation S1540, the OES calibration device may generate second correction data according to the light transmission characteristic from the viewport to the OES device, by calculating the deviation in each wavelength of the third light by using the fourth light measured by the spectrometer.

As set forth above, according to example embodiments, a spectrum change of a plasma in a chamber may be measured in consideration of a degree of window contamination and light transmission characteristics of the viewport.

According to example embodiments, the OES calibration system may perform an OES calibration operation rapidly and easily without a need to modify the existing chamber.

According to example embodiments, the OES calibration device may be implemented as a small portable device.

In addition, according to example embodiments, the OES calibration device may perform an OES calibration operation for a plurality of chambers using one spectrometer.

The various and advantageous advantages and effects of various example embodiments are not limited to the above description, and may be more easily understood in the course of describing a specific example embodiment.

While example embodiments have been shown and described above, it will be apparent to those skilled in the art that modifications and variations could be made without departing from the scope of the present disclosure as defined by the appended claims.

What is claimed is:

1. An optical emission spectroscopy (OES) calibration system comprising:
a chamber including a viewport, and in which a semiconductor process using a plasma is performed;
an adapter fastened to the viewport, and including a first beam splitter and a second beam splitter splitting incident light;
an OES device that detects plasma light generated in the plasma and transmitted through the adapter and that generates OES data based on the detected plasma light;
an OES calibration device including a light source, the OES calibration device generating correction data for compensating for deviations in the OES data; and
a spectrometer that detects light emitted from the light source and split by the first beam splitter or the second beam splitter,
wherein each of the OES device, the OES calibration device, and the spectrometer is fastened to the adapter through an optical cable, and
the OES calibration device generates the correction data using an intensity of light detected by the spectrometer.

2. The OES calibration system of claim 1, wherein the OES device comprises a spectroscope that decomposes the plasma light according to a wavelength to detect a spectrum; and
a detector that measures an intensity of each wavelength of the plasma light from the detected spectrum.

3. The OES calibration system of claim 2, wherein the OES device further comprises a lens assembly that provides the plasma light in parallel to the spectroscope.

4. The OES calibration system of claim 3, wherein the lens assembly comprises a focusing lens focusing the plasma light to form a point light source, and a collimator lens converting the point light source into parallel light.

5. The OES calibration system of claim 3, wherein the lens assembly comprises a telecentric lens converting the plasma light into parallel light and providing the parallel light to microgrooves of the spectroscope.

6. The OES calibration system of claim 1, wherein the first beam splitter splits the light emitted from the light source into first light in the viewport direction and second light in the spectrometer direction.

7. The OES calibration system of claim 6, wherein the OES calibration device generates the correction data by measuring a deviation in an intensity of the first light and the second light.

8. The OES calibration system of claim 1, wherein the second beam splitter splits the light emitted from the light source into third light in the OES device direction and fourth light in the spectrometer direction.

9. The OES calibration system of claim 8, wherein the OES calibration device generates the correction data by measuring deviation in an intensity of the third light and the fourth light.

10. The OES calibration system of claim 1, wherein the first beam splitter and the second beam splitter are each fastened to a mount provided on an outer surface of the adapter, and inserted into the adapter.

11. The OES calibration system of claim 1, wherein the OES calibration device further comprises a first shutter and a second shutter that control the light emitted from the light source to be transmitted to the adapter.

12. The OES calibration system of claim 1, wherein the OES calibration device further comprises an optical filter including at least one of a neutral density (ND) filter and a bandpass filter.

13. An OES calibration system comprising:
- a chamber including a viewport, and in which a semiconductor process using plasma is performed;
- an adapter fastened to the viewport, and including a first beam splitter and a second beam splitter splitting incident light;
- an OES device connected to the viewport through the adapter, and detecting an optical spectrum of the plasma to generate OES data; and
- an OES calibration device detachably fastened to the adapter, and including a light source emitting inspection light, and a spectrometer detecting the inspection light split by the first beam splitter and the second beam splitter,
- wherein the first beam splitter splits the inspection light into first light in the viewport direction and second light in the OES calibration device direction, and
- the second beam splitter splits the inspection light into third light in the OES device direction and fourth light in the OES calibration device direction.

14. The OES calibration system of claim 13, wherein the OES calibration device generates correction data for compensating for deviations in the OES data, using first correction data based on a difference in an intensity of the first light and the second light reflected by an inner window of the viewport and second correction data based on a difference in an intensity of the third light and the fourth light.

15. The OES calibration system of claim 14, wherein the OES calibration device generates the correction data by combining the first correction data and the second correction data in a frequency domain.

16. The OES calibration system of claim 13, wherein the OES calibration device further comprises an optical filter including at least one of a neutral density (ND) filter and a bandpass filter.

17. The OES calibration system of claim 13, wherein the first beam splitter and the second beam splitter are fastened to a mount provided on the outer surface of the adapter, and are inserted into the adapter.

18. An OES calibration device comprising:
- at least one light source; and
- at least one shutter connected to an adapter fastened to a viewport of each of a plurality of plasma chambers through an optical cable, the at least one shutter controlling each of a plurality of inspection lights generated from the at least one light source to be transmitted to the adapter of each of the plurality of plasma chambers,
- wherein the adapter comprises a first beam splitter and a second beam splitter fastened to a mount provided on an outer surface of the adapter and inserted into the adapter, and the first beam splitter and the second beam splitter split the incident light, and
- the OES calibration device detects an optical spectrum of the plurality of inspection lights that are split, and corrects OES data of each of the plurality of plasma chambers using the detected optical spectrum.

19. The OES calibration device of claim 18, wherein the light source comprises first to nth light sources corresponding respectively to the plurality of plasma chambers, and
the plurality of inspection lights have different wavelengths.

20. The OES calibration device of claim 18, wherein the OES calibration device further comprises a multiplexer dividing the light generated by the at least one light source in at least one of a wavelength region and a time region to generate the plurality of inspection lights.

* * * * *